Jan. 12, 1971  B. BURSON, JR  3,555,507
SELF-CANCELLING ELECTRONIC AUTO TURN SIGNAL SYSTEM
Filed May 19, 1967  4 Sheets-Sheet 2
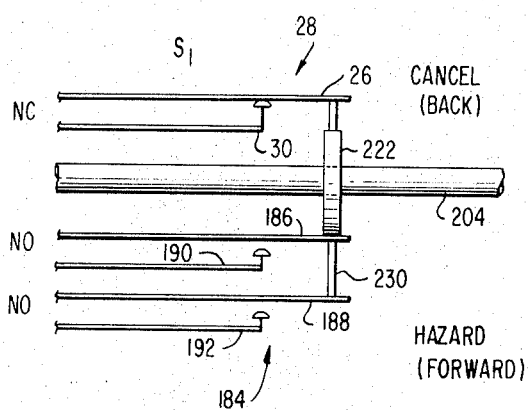
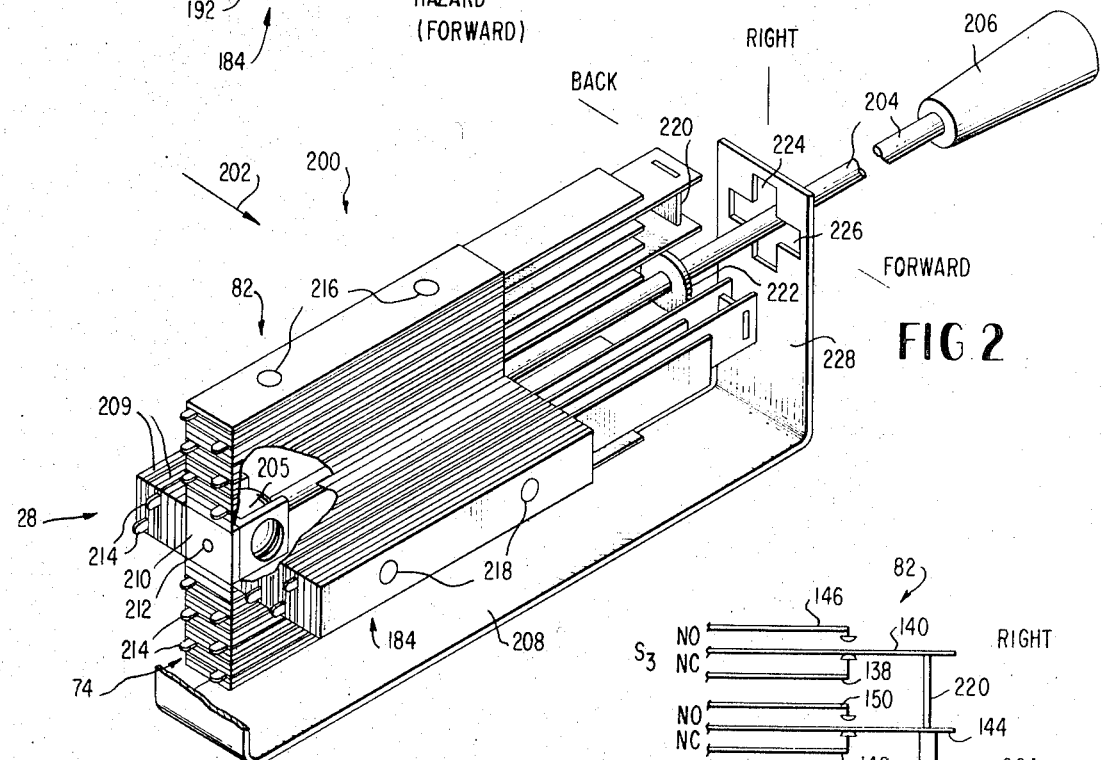
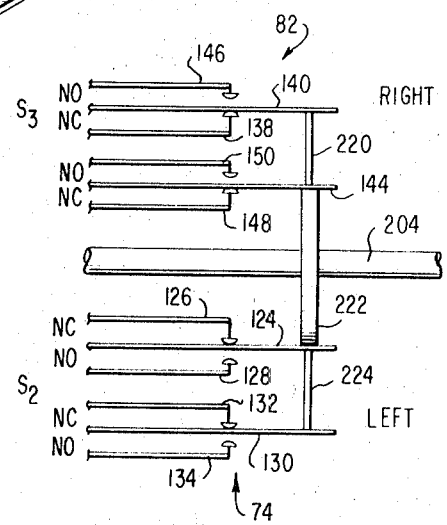
INVENTOR
BENARD BURSON, JR.
BY  *LeBlanc & Shur*
ATTORNEYS Jan. 12, 1971  B. BURSON, JR  3,555,507
SELF-CANCELLING ELECTRONIC AUTO TURN SIGNAL SYSTEM
Filed May 19, 1967  4 Sheets-Sheet 3

INVENTOR
BENARD BURSON, JR.

BY *LeBlanc & Shur*

ATTORNEYS

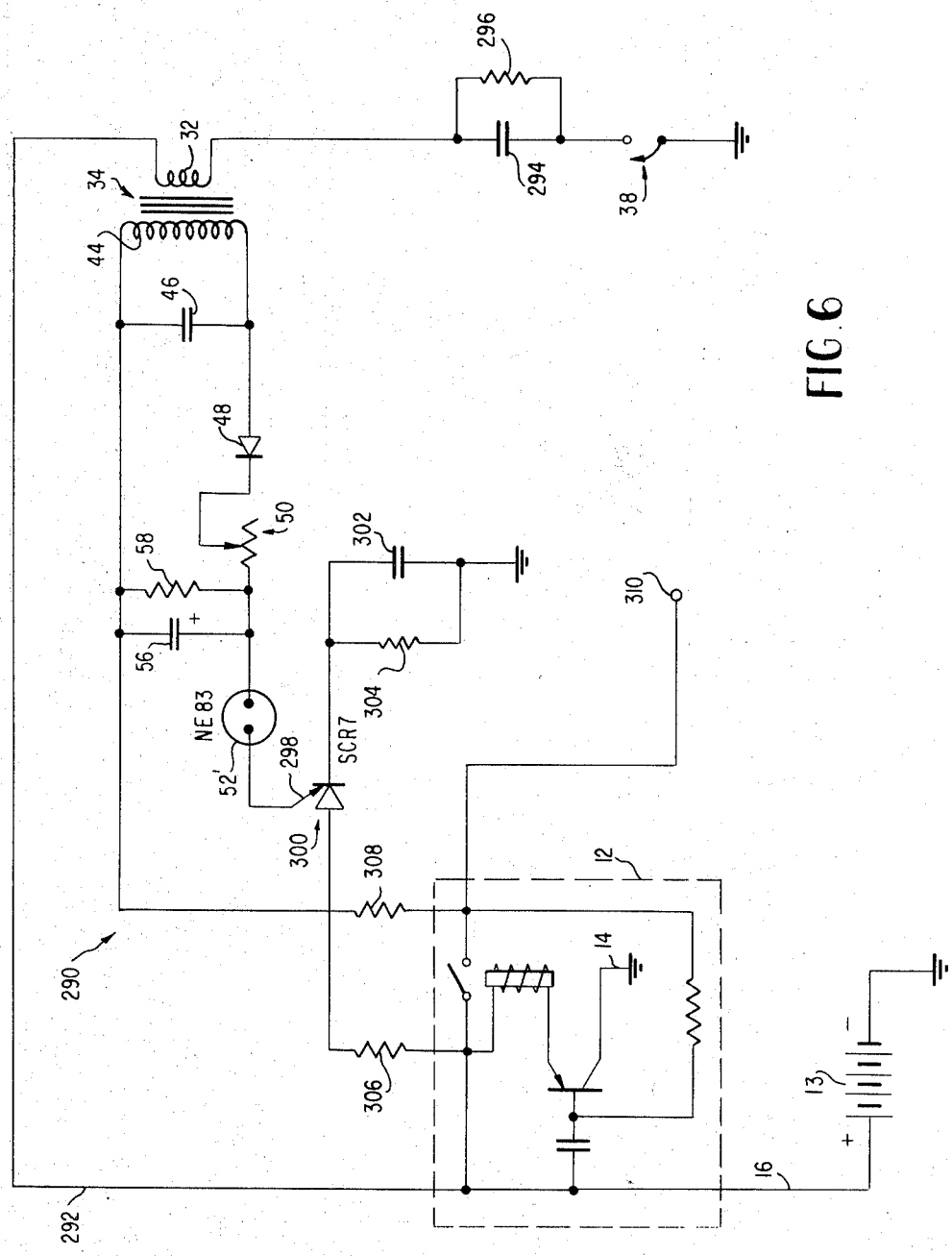

United States Patent Office 3,555,507
Patented Jan. 12, 1971

3,555,507
SELF-CANCELLING ELECTRONIC AUTO TURN
SIGNAL SYSTEM
Benard Burson, Jr., Austin, Tex., assignor to Bursonics,
Inc., Austin, Tex., a corporation of Texas
Filed May 19, 1967, Ser. No. 639,785
Int. Cl. B60q 1/00
U.S. Cl. 340—62                                    9 Claims

ABSTRACT OF THE DISCLOSURE

Disclosed is an automotive turn signal system in which cancellation is effected electronically rather than mechanically. The turn signal lever arm is continuously biased to a neutral position and returns to this position as soon as it is released by the driver. Momentary actuation of the lever closes a holding circuit and the appropriate lights blink until automatically cancelled by a pulse counting circuit. Cancellation time may be modified by vehicle speed. Hazard warning, manual cancellation, and adaptation to brake light switching are also disclosed.

This invention relates to an automobile turn signal system and more particularly to an all-electronic self-cancelling system of simplified and inexpensive construction, having a minimum of moving parts. Because of the electronic nature of the system, it may be incoporated in a small, lightweight package on or adjacent to the steering column of an automobile and completely avoids the necessity for linking the indicator actuator arm to the steering column by a cam or other mechanical device susceptible to wear and/or breakage.

In recent years, with the widespread adoption of turn signals for automotive vehicles, a large variety of indicating and cancellation systems have been proposed. In most systems, a turn is indicated by one or more blinking lights mounted front and rear at each side of the vehicle. These lights are actuated by an arm or lever mounted on or adajcent to the steering column, usually directly beneath the steering wheel. Cancellation is effected through a cam or other mechanical linkage directly connecting the lever arm to the steering wheel or steering column so that the lever arm is mechanically returned to a neutral position in accordance with the return movement of the steering wheel near the end of the turn. These turn signal systems and particularly the mechanical linkages coupling the indicator lever arm to the steering wheel, are susceptible to wear and breakage and, after a few years usage, in some cases have to be replaced.

The present invention avoids this disadvantage by providing a completely electronic system in which the turn signal actuator or lever arm is not mechanically linked to the steering wheel but in which cancellation is effected electronically in an automatic manner. This makes possible more reliable operation and completely eliminates prior difficulties due to mechanical wear and breakage.

Another disadvantage of the mechanical systems lies in the fact that they are not well suited to expressway type driving and in other situations in which it is desirable to indicate substantially less than a full 90° turn. That is, most mechanical systems require that the steering wheel be turned through a substantial arc before cancellation becomes automatic. As a result, when turn signals are used on expressways and other high speed roads to indicate a change of lane, as in passing a slower vehicle, rather than a full turn, the steering wheel is moved through an insufficient arc to render the cancellation system automatic or self-cancelling. The result is that, frequently, a motorist, after overtaking and passing a slower moving vehicle, will unknowingly continue down the road for several miles with the indicator lights still flashing when no lane change or turn is contemplated. This constitutes a serious traffic hazard since other motorists may expect the vehicle to make a turn and, in reliance upon the flashing signal, turn in front of the oncoming vehicle without leaving sufficient room to avoid a collision.

This problem has been recognized and has led to the development of time-actuated, cancelling systems which cancel the turn indicating signals independently of steering wheel movement after a predetermined time delay. One such system is disclosed in applicant's U.S. Pat. No. 3,110,011, issued Nov. 5, 1963. In the system of that patent, the number of flashes of the turn signals are counted and cancellation becomes automatic after a predetermined number of flashes have taken place. This system has been found quite effective in that it possesses rapid recovery and eliminates the time lag or delay evidenced by earlier thermal systems which do not immediately recover after an automatic cancellation and make it impossible for the driver to immediately institute a new turn indication.

The present invention is directed to a system of the same general type as disclosed in applicant's aforementioned patent in that it incorporates a pulse counting technique for automatic timed cancellation but, at the same time, provides a completely electronic system employing solid state or semi-conductive switches having no moving parts and requiring no mechanical linkage to the steering mechanism of the automobile or other vehicle in which the system is installed. Because of the solid state electronic nature of the system of the present invention, it may be incorporated in a small, lightweight package and has increased life due to a substantial overall reduction in the number of moving parts in the system. It is completely compatible with conventional automotive circuitry and may be operated directly off a conventional 12-volt automotive power supply. It may be connected directly to the brake light system so that the rear turn signal lights may be actuated in response to the application of the brakes by the vehicle operator and provision is also made in the system for modifying the cancellation time in accordance with vehicle speed. Other functions, such as hazard warning and manual turn signal cancellation are also included so that the present invention affords a universal electronic circuit for warning lights fully consistent with present day automotive requirements.

It is therefore one object of the present invention to provide an improved, self-cancelling, automotive turn signal system.

Another object of the present invention is to provide a completely electronic automotive turn signal system.

Another object of the present invention is to provide an improved, lightweight, economic turn signal system having a minimum of moving parts.

Another object of the present invention is to provide a turn signal system of small size and light weight having increased operating life and one which fully meets modern automotive safety light requirements.

Another object of the present invention is to provide an improved turn signal indicator system incorporating solid state switches, operable from a conventional automotive power supply. Incorporated in the system is an electronic circuit for counting the number of flashes of the blinking signals and automatically cancelling these signals after a predetermined number of flashes have taken place. In the circuit, are provisions for using the rear turn signal lights also as brake lights for providing hazard warnings, self-cancellation and modification of the cancellation time in accordance with vehicle speed.

These and further objects and advantages of the invention will be more apparent upon reference to the following specification, claims and appended drawings wherein:

FIG. 2 is a perspective view of the actuator arm and switch assembly for the turn signal system of FIG. 1;

FIG. 3 is a diagrammatic view showing the contact arrangement for right and left turn indication in the switch and actuator assembly of FIG. 2;

FIG. 4 is a diagrammatic view showing the contact assembly used for manual cancellation and hazard warning in the actuator and switch assembly of FIG. 2;

FIG. 6 is a circuit diagram of a modified pulse counting circuit for the system of FIG. 1.

Figure 1:
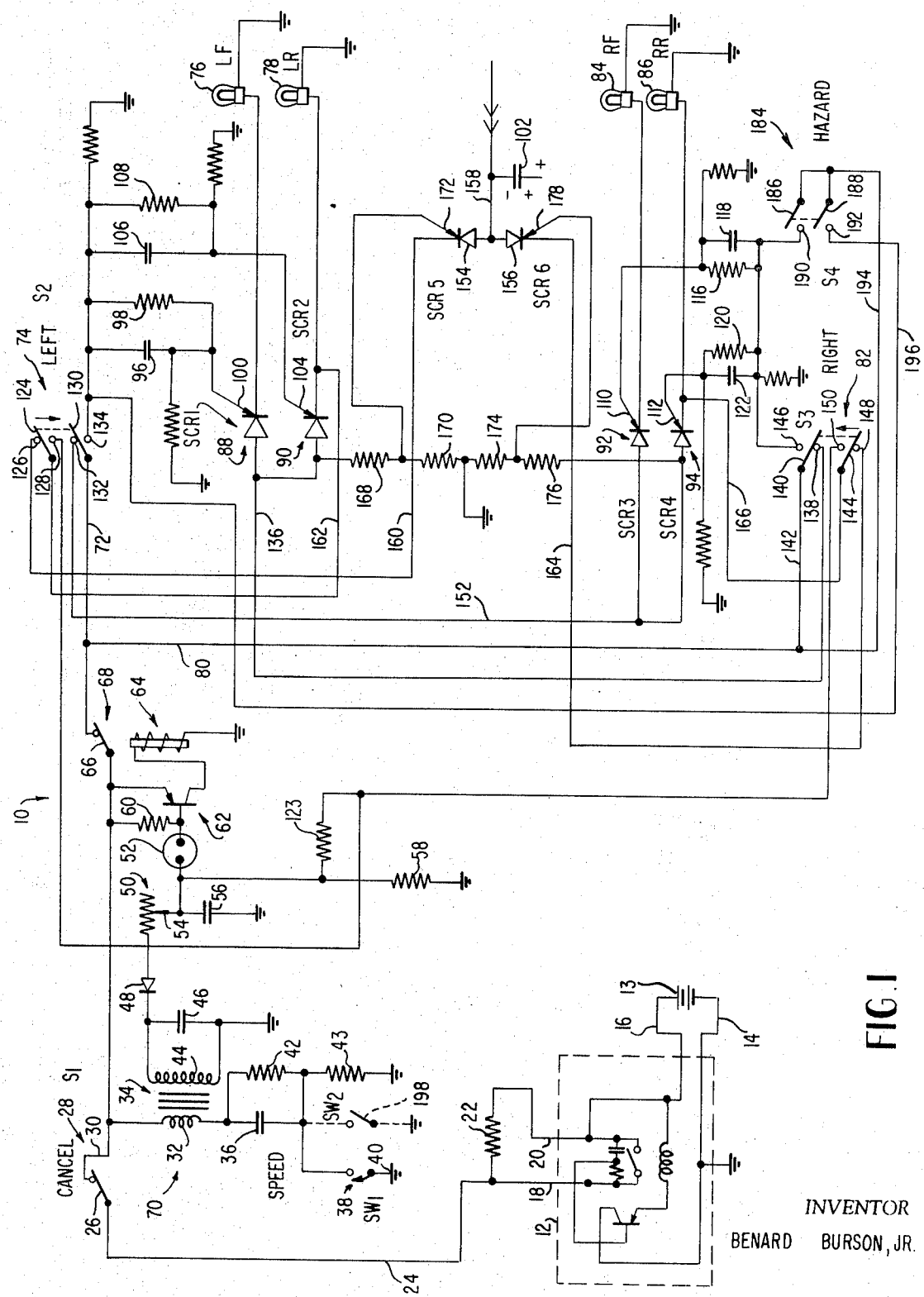
FIG. 1 is a detailed circuit diagram of the novel, self-cancelling electronic auto turn signal system of the present invention.

Referring to the drawings and particularly to FIG. 1, the novel turn signal system of the present invention, generally indicated at 10, comprises a flasher 12 connected between the ground terminal 14 and the positive terminal 16 of a conventional 12-volt automotive power supply 13. The flasher 12 is of conventional construction and may comprise any type of variable load flasher unit. In the preferred embodiment, the flasher is of the type described in U.S. Pat. No. 3,113,242.

Connected between terminals 18 and 20 of the flasher unit is a holding current resistor 22. One terminal of this resistor is connected by way of lead 24 to the movable contact 26 of a manually operated "cancel" switch 28 labeled S1. The stationary contact 30 of the switch is connected to the primary winding 32 of a voltage step-up pulse transformer 34 labeled T. Connected in series with primary winding 32 is a capacitor 36 and a speed responsive switch 38 labeled SW1. The other side of switch 38 is connected to the grounded side of the power supply as at 40. Capacitor 36 is shunted by a pair of resistors 42 and 43.

Connected across the secondary 44 of transformer 34 is a capacitor 46 and this capacitor is in turn connected through a rectifier diode 48 and variable potentiometer 50 to one side of a neon glow tube or discharge tube 52. Adjustable wiper 54 of the potentiometer is coupled through capacitor 56 to the grounded side of the power supply and the capacitor 56 is shunted by a discharge or drain resistor 58.

The other terminal of discharge tube 52 is connected to resistor 60 and to the base of a PNP junction transistor 62. The collector of transistor 62 is connected to the coil of a relay 64 which operates the movable contact 66 of relay switch 68. The portions of the circuit thus far described beginning with the pulse transformer 34 and ending with relay 64 and its switch 68 constitute a pulse counting circuit generally indicated by the refereince numeral 70. This circuit acts to count the number of flashes or pulses of lamps by opening relay switch 68 after a predetermined number of pulses or flashes have occurred.

Relay switch 68 is connected by way of lead 72 to a double-pole switch 74 labeled $S_2$ which is manually operated to initiate flashing of the left front turn signal indicator lamp 76 and the left rear turn signal indicator lamp 78. Relay switch 68 is also connected by way of lead 80 to a double-pole switch 82 labeled $S_3$ which is manually operated to initiate flashing of the right front turn signal indicator lamp 84 and the right rear turn signal indicator lamp 86. Lamps 76, 78 and 84, 86 are mounted on the front and rear of the automotive vehicle to provide turn signals by a series of flashes when the operator is about to make a turn or change lanes on a high speed road.

In the system of the present invention, the turn signal lamps are energized from the automobile power supply 13 by way of corresponding silicon controlled rectifiers 88, 90, 92 and 94, labeled $SCR_1$, $SCR_2$, $SCR_3$ and $SCR_4$, respectively. Silicon controlled rectifier 88 is triggered by a pulse passing through capacitor 96 and shunt resistor 98 connected between switch 74 and the SCR gate electrode 100. Gate electrode 104 of SCR 90 is similarly triggered by switch 74 through capacitor 106 and shunt resistor 108.

SCR's 92 and 94 are similarly provided with gates 110 and 112. When switch 82, controlling the right side lights 84 and 86, is manually operated, gate pulses are supplied to SCR 92 by way of resistor 116 and capacitor 118 and to SCR 94 by way of resistor 120 and capacitor 122. The turn signal circuit is coupled to the pulse counter by a resistor 123.

The operation of the basic system so far described is as follows: When the operator wishes to indicate a left turn or move into a left lane, he momentarily moves switch 74 from the position illustrated in FIG. 1 in the direction of the arrow so that the movable switch blade 124 moves from stationary contact 126 to stationary contact 128 and the second movable switch blade 130 simultaneously moves from stationary contact 132 to stationary contact 134. The switch is only momentarily operated and as soon as the automobile driver releases pressure, switch blades 124 and 130 are spring biased so that they immediately return to the position illustrated in FIG. 1 with blade 124 engaging contact 126 and blade 130 engaging contact 132. However, this momentary closure is sufficient to momentarily connect gates 100 and 104 of SCR's 88 and 90 through capacitors 96 and 106, respectively, to the power supply 13 through flasher 12 and produces a sufficient impulse on the gate electrodes 100 and 104 to switch the SCR's 88 and 90 on. This in turn energizes the left front bulb 76 and the left rear bulb 78 through the anode-cathode circuit of the respective SCR's 88 and 90. SCR's 88 and 90 are connected to the flasher unit 12 by way of lead 136, stationary contact 138 of right switch 82, movable blade 140 of that same switch, lead 142, lead 80, relay switch 68, normally closed cancel switch 28, and lead 24.

Similarly, a right turn or right lane change is indicated by the momentary actuation of the movable blades 140 and 144 of right switch 82. Movement of blade 140 into engagement with stationary contact 146 impulses gates 110 and 112 of SCR's 92 and 94 to turn these SCR's on so that indicator lamps 84 and 86 are energized through the anode-cathode circuits of SCR's 92 and 94. At the same time, movable blade 144 is moved from stationary contact 148 to stationary contact 150 in the direction of the arrow indicated in FIG. 1 for a purpose more fully described below. The anode-cathode circuits of the SCR's 92 and 94 and hence lamps 84 and 86 are connected to flasher 14 by way of lead 152, stationary contact 132 of left switch 74, movable blade 130 of that switch, relay 66, normally closed cancel switch 28, and finally lead 24. It should be noted that when one of the switches 74 or 82 is momentarily operated and then released, the anode-cathode circuit of the corresponding SCR's remains continuously coupled to the flasher through the other or unactuated switch so that this circuit is never interrupted and the pulse applied to the gate causes the SCR's to be rendered conductive through their anode-cathode paths.

The SCR's are semiconductive latching devices such that once they have been turned on by an impulse applied to the gates, they remain on even after the impulse is removed as long as the anode-cathode current remains above a predetermined minimum level and this minimum current is sometimes referred to as the SCR holding current. In the preferred embodiment of the present invention, the holding current for the SCR's 88 and 90, 92 and 94 is in the neighborhood of 12 milliamperes. Flasher 12, which may be of any conventional construction, includes a vibrator which periodically changes the voltage at terminal 18 and therefore the current supplied through the SCR's to the flashing lights 76 and 78 or alternatively to the flashing lights 84 and 86. The internal impedance of the flasher in combination with the holding current resistor 22 is chosen such that the current through the SCR's anode-cathode circuits alternates between a level sufficient to illuminate the corresponding right or left lamps and a lower level which is not sufficient to illuminate the lamps but is still well above the holding current level of the SCR's so that the SCR's remain conductive. Resistor 22 assures that there will at all times be a direct current path from the positive side of the power supply to its other or grounded side through the conducting SCR's and lamps and is chosen to insure that the operation of the flasher 12 does not reduce the current through the SCR's below the nominal 12 milliamperes holding current level. Thus, the SCR's when once triggered, continue to conduct through several flashes of the energized lamps 76 and 78 or 84 and 86 until the current to the SCR anode-cathode circuits is completely interrupted by relay switch 68 after a predetermined number of flashes or pulses as counted by the counting circuit 70.

Variations in voltage at the output terminal 18 of the flasher appear across the primary winding 32 of pulse transformer 34 and these pulses appear across the secondary winding 44 of the transformer. These pulses are rectified by diode 48 and capacitor 46 so that they are applied as unidirectional charging impulses which gradually build up a charge on the upper plate of capacitor 56. After a predetermined number of pulses, as determined by the adjustment of wiper arm 54, have been applied to capacitor 56, the charge on capacitor 56 builds up to a sufficient level to fire the neon glow tube 52. The discharge current of capacitor 56 through conducting neon tube 52 is applied to the base of transistor 62 causing the transistor to conduct and relay 64 to be energized opening relay switch 68. The momentary opening of switch 68 by the capacitor discharge current completely interrupts the current flow through the anode-cathode circuit of the SCR's 88 and 90 or 92 and 94, so that the SCR's are rendered nonconductive and the corresponding lamps automatically are deenergized or turned off.

In many instances, it is desirable that the rear turn signal lights do double duty and also function as brake lights to indicate that the brakes of the vehicle have been applied. This requires that the turn signal on the particular side for which a turn is indicated continue to flash when the brake light is pressed on but that the rear light on the side that is not flashing or indicating a turn will come on and be continuously illuminated when the brake light switch is depressed. Provision is made for this in the circuit of FIG. 1 in the form of additional silicon controlled rectifiers 154 and 156 labeled SCR$_5$ and SCR$_6$, respectively. The junction of these two SCR's is connected to the positive side of the power supply through a conventional brake light switch (not shown) by way of lead 158. The brake light switch is shunted by a capacitor 102 to prevent pulses from the stop light system from actuating the turn signal lamps. SCR's 154 and 156 are effectively connected through the brake light or stop light switch across the automotive power supply in parallel with the flashing SCR's 88, 90, and 92, 94 such that when no turn is indicated, SCR's 154 and 156 are both rendered fully conductive by closure of the stop light switch and continuously apply illuminating current to rear bulbs 78 and 84, respectively, as long as the brake is depressed. SCR's 154 and 156 are, of course, immediately turned off when the brake is released and the stop light switch opened to break the anode-cathode current path through the SCR's 154 and 156 from the automotive power supply. The current path from the positive side of the power supply by way of lead 158 in FIG. 1 may be traced through the anode-cathode of SCR 154, lead 160, stationary contact 126 of switch 74, movable blade 124 of the same switch and lead 162 to the left rear bulb 78. Similarly, the conductive current brake light path for the right rear bulb 86 may be traced from the lead 158 through the anode-cathode circuit of SCR 156, lead 164, stationary contact 148 of right switch 82, movable blade 44 of the same switch, and lead 166 to the right rear bulb 86.

Resistors 168 and 170 are provided to insure that when the brake is depressed, SCR 154 will not override SCR 90 if the rear left lamp 78 is flashing. This lamp continues to flash to indicate a turn even when the brakes are depressed and the stop light switch closed. When rear bulb 78 is flashing, the potential on gate electrode 172 is substantially reduced so as to render SCR 154 nonconductive. That is, when SCR 90 is nonconductive and bulb 78 not flashing, gate 174 is at a relatively high potential as determined by resistors 168 and 170. In this case, energization of the stop light switch will cause SCR 154 to conduct. However, if SCR 90 is already conductive, gate 172 of SCR 154 is at a very much lower potential and the gate acts to prevent SCR 154 from conducting. Resistors 174 and 176 labeled $R_9$ and $R_{10}$, respectively, perform the same function for the gate 178 of SCR 156. That is, when SCR 92 is not conductive, the stop light or brake light switch will cause SCR 156 to conduct. However, if SCR 92 is already conductive to indicate a right turn, gate 178 of SCR 156 assumes a much lower potential due to the reduced drop across the conducting SCR 92 and this reduced potential at gate 178 is sufficient to prevent SCR 156 from conducting even when the stop light or brake light switch is closed.

Capacitor 96 and resistor 98 are connected to the gate 100 of SCR 88 and assure that only a short duration pulse is applied to the gate 100 even though switch 74 is held down for a long time. Capacitor 106 and resistor 108 perform the same function for gate 104 of SCR 90. Similarly, capacitor 122 and resistor 120 assure that only a single pulse will be applied to gate 112 of SCR 94 even though switch 82 is actuated more than only momentarily. Capacitor 118 and resistor 116 perform the same function for gate 110 of SCR 92.

The novel turn system of the present invention as illustrated in FIG. 1, also includes a manually operated hazard or warning switch 184 labeled as $S_4$. When this switch is colsed, it causes all four lamps 76, 78, 84 and 86 to flash continuously until the switch is opened. It can be used in emergencies to provide warning to oncoming vehicles when the automobile is stopped on or near a heavily traveled roadway such as during an emergency in which the stopped vehicle may constitute a hazard to oncoming traffic. Switch 184 again comprises a double-pole switch having movable blades 186 and 188, simultaneously movable into and out of engagement with stationary contacts 190 and 192. Blades 186 and 188 are both contacted to lead 194 which is, in turn, connected by way of lead 80 to the closed relay switch 68 and through this switch to the flasher 12. When the switch 184 is closed, an impulse is supplied from blade 186 through stationary contact 190 to the gates of SCR's 92 and 94, causing them to turn on and lamps 84 and 86 to flash under the influence of flasher 12. Similarly, the engagement of blade 188 with stationary contact 192 supplies an impulse by way of lead 196 through capacitors 96 and 106 to the gates of SCR's 88 and 90, rendering them conductive and causing lamps 76 and 78 to flash under the influence of flasher 12.

In order to avoid automatic cancellation during hazard warning, the pulse counting circuit 70 may be provided with a disabling switch indicated in dashed lines at 198 and labeled SW2. This switch may, if desired, be ganged with the hazard switch 184 to open when the hazard switch 184 is closed so as to disable the counting circuit during hazard warning. Switch 198 is provided as an alternative to speed switch 38 and not in addition to it. Thus, when switch 198 is included in the system, speed switch 38 is removed and the opening of switch 198 breaks the circuit through the primary winding 32 to completely disable the pulse counter 70. The manner in which cancellation is avoided during hazard warning in the preferred embodiment utilizing the speed switch 38 in place of switch 198, will be described below.

FIG. 2 shows the manual actuator unit generally indicated at 200 which is normally mounted on the steering column of the automobile. In FIG. 2, the direction of forward movement of the automotive vehicle in which unit 200 is mounted is indicated by the arrow 202. The unit includes an actuator arm or lever 204, terimnating in a handle 206 which, in most American cars, projects from the steering column beneath the steering wheel to the driver's left. The unit also includes a housing 208, partially broken away for the sake of clarity, which may be mounted to the steering column in any conventional manner. This housing supports a plurality of leaf contacts separated by intermediate spacers 209 of suitable insulating material. The alternate conductors and insulators are formed in criss-cross horizontal and vertical stacks, forming the four switches 28, 74, 82 and 184 previously described. Lever 204 is mounted by a conventional universal joint 205 to a back plate 210 by means of a pin 212. The back plate is attached to the rear of the criss-cross stacks which, in turn, are suitably supported from the housing 208. The stacks preferably comprise alternate conductive metal leaves separated by an appropriate number of intermediate spacers of suitable insulating material, and attached to the end of each leaf, as by soldering or the like, are the electrical contacts 214, for making connection to the various leads illustrated in FIG. 1. The individual elements of each of the four stacks are connected together by insulating pins such as 216 and 218.

FIG. 3 illustrates the conductive leaves which cooperate to form the right indicator switch 82, and the left indicator to form the right indicator switch 82, and the left indicator switch 74. In this case, the term "right" is synonymous with the term "up" since, when indicating a right turn, the driver normally lifts lever 204 to move it in a clockwise direction about the steering column in the same direction that the steering wheel is to be turned. Similarly, to indicate a left turn, lever 24 is moved downwardly in a counterclockwise direction about the steering column which direction corresponds to the rotation of the steering wheel for the intended turn.

Stationary contacts 146, 138, 150 and 148, of switch 82 may be of spring steel or may be of thicker, more rigid conductive metal so that they do not significantly move or bend when engaged by the blades 140 and 144. The latter are preferably of flexible spring metal so that they move, i.e., resiliently, flex or bend, to engage either one set of stationary contacts and/or the other simultaneously. Blades 140 and 144 are connected by an insulating block 220 which causes them to bend or deflect as a unit. Rigidly secured to lever 204 is an insulating disc 222 which normally engages the underside of blade 144, resting on contact 148 as illustrated in FIG. 3. Movement of the lever arm 204 upwardly in FIG. 2, as guided by the crossed slots 224 and 226 in the end 228 of housing 208, causes the disc to move blade 144 and, consequently, blade 140 through insulating block 220 from the lower stationary contacts to the upper stationary contacts in FIG. 3. However, as soon as the lever arm is released by the vehicle opeartor, the resiliency of leaf springs 140 and 144, acting through the insulating block 240 and disc 244, immediately return the lever arm to the central or neutral position illustrated in FIGS. 2 and 3 so that the switch is only opearted as long as the automobile driver holds the lever up.

Downward movement of the lever through slot 224 causes disc 222, around the lever arm, to move flexible blade 124 downwardly. This blade is connected to the movable blade 130 of switch 74 by a similar insulating block 224, so that this switch operates in the same manner as switch 82. Again, the resiliency of the leaf springs or movable blades 124 and 130 immediately return lever arm 204 to its central or neutral position as soon as it is released by the driver.

Movable blades 186 and 188 in FIG. 4 are similarly of conductive spring metal and are joined by an insulating block 230, similar to the blocks 220 and 224 previously described. When the lever arm is moved through the slot 226 in the forward direction away from the automobile driver to actuate switch 184 and cause all lights to flash, blades 186 and 188 are resiliently bent or deflected by the disc 222 so as to close the normally open contacts of this switch. Again switch closure is only momentary since springs 186 and 188 immediately return the lever arm 204 to the central or neutral position. As before, once the SCR's are impulsed, they remain conducting until the circuit is broken. The lights may be extinguished by switch 28 through manual movement by the driver of the lever arm rearwardly of the car toward himself along slot 226. In this case, disc 222 deflects flexible arm 226 away from stationary contact 30 breaking the circuit from the power supply through the flasher 12 to the SCR's to extinguish all the lamps 76, 78, 84 and 86 of FIG. 1.

When no speed switch is utilized, the separate manual switch 198 of FIG. 1, labeled SW2, may be provided to disable the pulse counter during hazard warning. It may be mounted on the dashboard of the automobile and manually operated by the driver, i.e., permanently opened to disable the counting circuit and left in the open position until the driver decides to cancel the hazard signal, at which time he not only operates switch 28 but also recloses the dashboard switch 198. However, in the preferred embodiment, switch 198 is not used and, instead, the unit is provided with a speed switch 38. Speed switch 38 is a switch which periodically opens and closes in accordance with the speed of the automobile. Each opening and closing of the switch 38 completes and opens the circuit through the primary 32 of pulse transformer 34 so that the transformer is pulsed and an additional charge built up on capacitor 56 with each cycle of the speed switch. The impulses to the transformer from the speed switch 38 are cumulative to those from the flasher 12, resulting in a build up of charge across capacitor 56 of FIG. 1 in a more rapid manner dependent upon the speed of the automobile, i.e., at low speeds it is normally desirable for the pulse counter to take a longer time to cancel the signal since, at low speeds, more time is required to make a turn. However, at high speeds, such as in passing vehicles on an expressway, the turn signal indicator need only be on for a short time. With switch 38 operating in accordance with the speed of the vehicle, at high speeds, the charge is much more rapidly built up on capacitor 56 and the automatic cancellation time correspondingly reduced.

Figure 5:
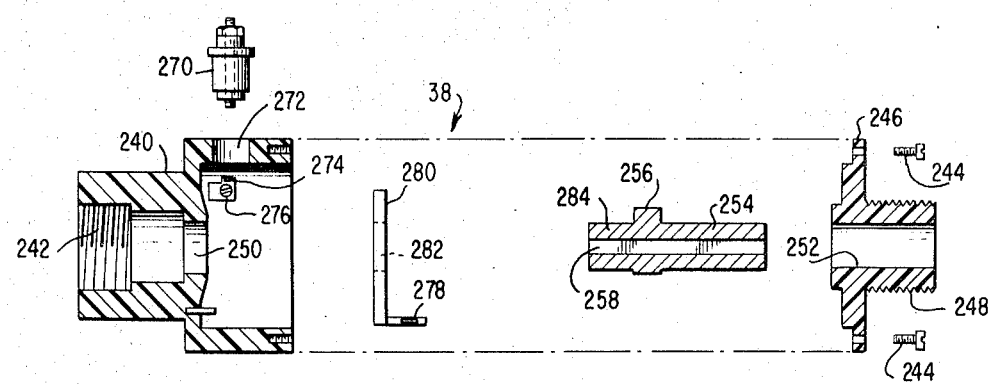
FIG. 5 is an exploded view of a speedometer cable switch usable with the system of FIG. 1 so as to make cancellation time depend upon vehicle speed.
Figure 5B:
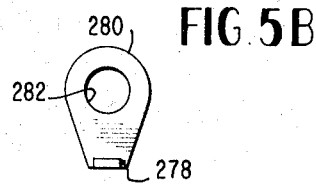
FIGS. 5a–5d show various components of the speedometer cable switch of FIG. 5.
Figure 5C:
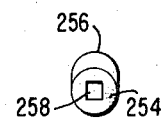
Figure 5D:
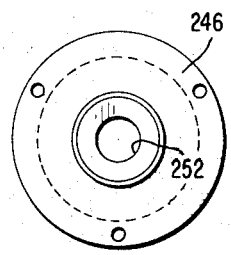
Figure 5A:
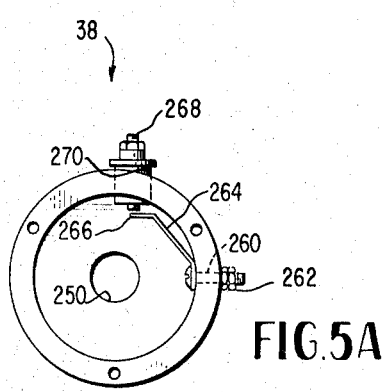

FIG. 5 illustrates in exploded view with parts in section, a preferred form of the speed switch 38 which switch is adapted to be connected directly to the speedometer cable of the automobile. Switch 38 in FIG. 5 comprises a housing 240, preferably made of suitable insulating material and having one end internally threaded as at 242 so that it may be attached directly to the side of the speedometer. Attached to the housing 240 by screws 244, is a cover plate 246, externally threaded as at 248, for direct connection to the speedometer cable housing. Thus, the switch 38 may be directly connected between one end of the cable housing and the side of the speedometer.

Mounted for rotation in the bore 250 of housing 240 and the bore 252 of faceplate 246, is a hollow cam shaft 254, carrying an eccentric cam 256, formed integral with it. The center of shaft 254 is provided with a rectangular cross section bore 258 adapted to receive a rectangular speedometer cable which passes completely through the shaft and through the bores 240 and 252 from the cable housing directly through switch 38 to the speedometer.

As the speedometer cable rotates, it rotates shaft 254 and consequently cam 256.

FIGS. 5a, 5b, 5c and 5d show various components of the switch 38. Mounted by a bolt 260 and nut 262 to the inside wall of housing 240, is a leaf spring contact 264. This contact has a turned over end 266, normally slightly spaced from the end of a threaded, adjustable, stationary contact 268, threadable through a sleeve 270 mounted in an aperture 272 formed in the housing wall by a friction fit or otherwise suitably secured in the aperture. When shaft 254 rotates with the speedometer cable, cam 256, once during each rotation, engages leaf spring 264 and urges it into contact with stationary contact 268. Thus, the circuit is opened and closed once during each revolution of the speedometer cable.

As an additional feature, a second contact 274 may be secured to the sidewall of the housing 240 by a screw 276. Contact 274 is adapted to resiliently engage a corresponding contact 278, mounted on a friction sleeve 280 illustrated in FIG. 5. The friction sleeve 280 is provided with a central aperture 282 adapted to be received with a friction fit over the end 284 of cam shaft 254. Friction sleeve 280 goes part way around with the shaft 254 and then slips. When the vehicle is moving forward, friction keeps contact 278 away from contact 274 because of the direction of rotation of shaft 254. However, when the vehicle backs up, the direction of rotation of shaft 254 is reversed and, because it carries sleeve 280 by friction fit, the sleeve will be rotated in an opposite direction to establish engagement between contacts 278 and 274. These contacts may complete a circuit to a buzzer or oscillator or some other form of noise-maker to make a back-up alarm device in the same unit. In this way, the automobile driver may be provided with a back-up alarm to alert others that the vehicle is backing up.

FIG. 6 shows a modified portion of a turn signal system of the present invention wherein like parts bear like reference numerals. In particular, FIG. 6 illustrates a modified pulse counting system generally indicated at 290, again connected to the flasher 12 and to the 12-volt automotive power supply 13. Output from flasher 12 is by way of lead 192 to the primary winding 32 of transformer 34. The other side of primary winding 32 is connected through a capacitor 294 and a resistor 296 and through the speed responsive switch 38 to the negative side of the power supply. The pulse counting portions of the circuit including rectifier diode 48, potentiometer 50, firing capacitor 56, and leakage resistor 58, are similar to that illustrated in FIG. 1. Again, a charge builds up on capacitor 56 in accordance with the number of pulses passed through transformer 34 until the voltage across neon glow tube 52' is sufficient to cause this tube to fire. In this embodiment, the glow tube preferably comprises a NE83 rather than the NE2 type glow tube of FIG. 1.

Discharge of the capacitor through the glow tube 52' is to the gate 298 of a silicon controlled rectifier 300 labeled SCA 7. One side of SCR 7 is connected to the negative terminal of the battery through capacitor 302 and resistor 304. The other side of SCR 7 is conected to the flasher 12 through resistors 306 and 308.

The system illustrated in FIG. 6 eliminates the need for a relay corresponding to the relay 64 of FIG. 1. Resistors 306 and 308 perform a function similar to holding current resistor 22 of FIG. 1, i.e., in FIG. 6, resistors 306 and 308 prevent the current in the system from going below the holding current required to hold the SCR's 88, 90, 92, and 94 on. These SCR's and the associated circuitry illustrated in FIG. 1 are connected to the terminal 310 in FIG. 6 in the same manner that they are connected to the stationary contact of relay switch 68 in FIG. 1.

In operation, when capacitor 56 reaches the firing point of glow tube 52' in FIG. 6 (an NE83 is substituted for the NE2 of FIG. 1 in order to obtain added current and a larger pulse for firing the SCR), the SCR 300 conducts quickly charging capacitor 302. This pulse or current is rather short in duration and only long enough to charge capacitor 302 but, in effect, for that short time, it causes a high current flow through resistor 306 and lowers the voltage through the SCR's connected to terminal 310 by means of which they are extinguished or stop conducting. In effect, when SCR 300 conducts for a short time, the voltage drops quickly and the turn signals turn off. Typical values for the components in FIG. 6 are resistor 306, 50 ohms; resistor 308, 300 ohms; SCR300, RCA type 40378; and capacitor 302, 500 microfarrads at 12 volts. Resistor 304, which is used to quickly discharge capacitor 302, may be 120 ohms.

It is apparent from the above that the present invention provides an improved automatic turn signal system almost completely electronic in nature and which has a minimum of moving parts to wear or fail. In particular, it completely eliminates the necessity for cam or other mechanical linkages normally used to return a turn signal actuator to the neutral position after the turn has been completed. Provision is made in the present invention for completely automatic cancellation and the system is fully compatible with existing automotive requirements in that it incorporates manual cancellation, hazard warning, brake light operation, all under the influence of semiconductor switching devices in the form of silicon controlled rectifiers.

A further important feature of the present invention includes the fact that the pulse cancellation or pulse counting time may be modified in accordance with the speed of the vehicle. The standard flashing rate as set out by the society of automotive engineers is about 15 seconds on and 15 seconds off or about 2–3 cycles per minute. In the preferred embodiment, at this slow rate, the pulses are bled off or discharged through resistor 58 in FIG. 1 in parallel with the capacitor 56 without firing glow tube 52. That is, at the conventional pulse rate produced by flasher 12, capacitor 46 will not gather sufficient charge to ever fire the neon glow tube 52. However, the glow tube will fire with the speedometer switch connected in the circuit in series with the primary winding 32 of the transformer so that once per revolution (or more often, if desirable) the primary winding circuit is pulsed. This gives faster pulses to the pulse transformer which, while not affecting the rate of flashing of the turn signal lamps 76, 78, 84 and 86, will produce up to as many as 60 pulses per minute through the transformer by the speeding vehicle rotating the speedometer switch to make and break the circuit to the primary winding 32 through the speedometer switch. Whenever the vehicle is moving, the combined effect of pulses from both the flasher and the speed switch 38 are such that there is not sufficient time for capacitor 56 to discharge between pulses through resistor 58 and a charge builds up on capacitor 56 to fire the glow tube. This build up increases in rate with increased vehicle speed.

Not only is the above important in terms of making the cancellation time responsive to speed, but it has the added advantage that the turn signals will not self-cancel when the vehicle is stopped. For example, at an unusually busy and complicated intersection, a vehicle may be stopped for a relatively long time, and might otherwise cancel itself before the turn were completed. With the speed responsive system of the present invention incorporating the switch 38, the cancellation unit is completely ineffective when the vehicle is completely stopped and, in this case, the lights will continue to flash. It is only when the vehicle moves and speed switch 38 is operated, that the combined effect of the speed switch and flasher 12 is sufficient to build up a firing voltage across capacitor 56.

In instead of the speed switch, the separate switch 198 is used, then leakage resistor 58 in FIGS. 1 and 6 is removed. This permits the flasher alone to cancel the signal. Resistor 43 is also removed so that the pulse counter is disabled when switch 198 is opened.

While a specific preferred embodiment has been illustrated, it is apparent that various modifications and changes can be made. The turn switch of FIG. 2 may be mounted in any desired manner adjacent the steering wheel of the automobile, and may take any of a number of conventional forms and shapes. However, important features of the switch include the fact that it is a momentary type switch, spring biased to neutral position when pressure is released, and that it includes no cams or other return devices but is simply spring returned by the leaf contacts themselves. The disclosed switch has extremely long life and dependability of operation.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A turn signal indicator system for automotive vehicles and the like comprising right and left turn signal lamps, means for coupling said lamps to a power supply, a manually actuated switch lever for mounting adjacent the steering wheel of a vehicle, said lever being movable from a neutral position to either a right or left position for energizing said right and left lamps respectively, means resiliently biasing said lever to said neutral position, a flasher coupled to said lamps for causing said lamps to blink, and switch means for coupling said flasher to said lamps, said switch means being responsive to momentary actuation of said lever to either said right or left position for connecting said flasher to the respective lamp for a predetermined length of time independent of return of said lever to said neutral position, said switch means including a pulse counter for extinguishing said lamps after a predetermined number of blinks.

2. A system according to claim 1 including a speed switch, and means coupling said speed switch to said pulse counter whereby the count of said counter is modified by the speed of the vehicle.

3. A system according to claim 2 wherein said speed switch is coupled to the speedometer cable of a vehicle.

4. A turn signal system comprising a plurality of turn signal lamps, a flasher for causing said lamps to blink, a plurality of silicon controlled rectifiers coupling said flasher to said lamps, a momentary closure switch coupled to said rectifiers for turning said rectifiers on, time responsive means coupled to said rectifiers for turning said rectifiers off after a predetermined time, said switch being continuously resiliently biased to an open position, said rectifiers having gate electrodes and pulse forming means coupling said switch to said gate electrodes whereby a single trigger pulse is supplied from said switch to said gate electrodes when said switch is closed.

5. A system according to claim 4 wherein said time repsonsive means interrupts the current flow through the anode-cathode circuit of said rectifiers after said lamps have flashed a predetermined number of times.

6. A turn signal system comprising left and right front and rear turn signal indicator lamps, a silicon controlled rectifier coupled to each of said lamps, a flasher for varying the current through said rectifiers to said lamps to cause said lamps to blink, said flasher including impedance means for maintaining said current flow above the holding current level of said rectifiers even when said lamps have blinked off, a normally open manual switch, means continuously resiliently biasing said switch to said open position, pulse forming means responsive to manual closing of said switch for supplying a single trigger pulse to said rectifiers whereby said rectifiers remain on even after said switch has opened, a pulse counter coupled to said flasher, and means coupled to said counter for momentarily reducing said current flow below said holding current level to extinguish said lamps.

7. A system according to claim 6 including a hazard switch for simultaneously supplying a triggering impulse to all of said rectifiers.

8. A system according to claim 6 wherein said pulse counter comprises a pulse transformer coupled to said flasher, a capacitor coupled to the output of said transformer, a glow tube which fires when the charge on said capacitor reaches a predetermined level by the speed of a vehicle.

9. A system according to claim 8 including a discharge resistor across said capacitor for discharging said capacitor at a rate such that pulses from said flasher alone are insufficient to fire said glow tube.

References Cited

UNITED STATES PATENTS

| | | | |
|---|---|---|---|
| 2,098,742 | 11/1937 | Curtiss | 340—56 |
| 3,319,073 | 5/1967 | Wrin | 340—73 |
| 3,396,367 | 8/1968 | Lohse | 340—56 |
| 3,428,943 | 2/1969 | Carp et al. | 340—251 |

DONALD J. YUSKO, Primary Examiner

H. S. COHEN, Assistant Examiner

U.S. Cl. X.R.

340—56, 73